(12) United States Patent
Kusunoki

(10) Patent No.: US 7,044,594 B2
(45) Date of Patent: May 16, 2006

(54) IMAGE FORMING METHOD AND IMAGE FORMING APPARATUS

(75) Inventor: Naoki Kusunoki, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/942,927

(22) Filed: Sep. 17, 2004

(65) Prior Publication Data
US 2005/0058955 A1 Mar. 17, 2005

(30) Foreign Application Priority Data
Sep. 17, 2003 (JP) .............................. 2003-324363

(51) Int. Cl.
*B41J 2/01* (2006.01)

(52) U.S. Cl. ..................... 347/102; 347/101; 347/212; 430/30

(58) Field of Classification Search ................ 347/101, 347/102, 212
See application file for complete search history.

(56) References Cited

U.S. PATENT DOCUMENTS 5,160,399 A * 11/1992 Ueda et al. ................. 156/359
6,164,849 A * 12/2000 Koyama ................ 400/120.01

FOREIGN PATENT DOCUMENTS

| JP | 10-319621 | 12/1998 |
| JP | 2000-264481 | 9/2000 |
| JP | 2001-092171 | 4/2001 |

* cited by examiner

Primary Examiner—Stephen Meier
Assistant Examiner—Ly T Tran
(74) Attorney, Agent, or Firm—Whitham, Curtis, Christofferson, & Cook, PC

(57) ABSTRACT

The image forming method includes a recording step of recording an image on an image recording layer of an image recording medium according to image data, a material setting step of setting a coating film to be provided on the image recording layer according to glossiness data indicating glossiness of the image reproduced by the image data, a condition setting step of determining a condition of a surface processing of the coating film by considering the set coating film and according to the glossiness data, and a processing step of performing the surface processing of the coating film in accordance with the determined surface processing condition.

6 Claims, 4 Drawing Sheets

IMAGE FORMING METHOD AND IMAGE FORMING APPARATUS

BACKGROUND OF THE INVENTION

The present invention relates to a technical field of image formation, and more particularly to an image forming method and an image forming apparatus capable of forming a high-quality image provided with gloss appropriate for the contents etc. of the image.

Various surface processing techniques are known for finishing image surfaces glossy like those of photographic prints or properly controlling surface glossiness so that images look fine, So as to add enhanced value to Images (hard copies) outputted by ink jet printers and electrophotographic printers.

For example, JP 10-319621 A discloses a method of forming an image by electrophotography, in which, after formation of a color image, a transparent layer of inorganic oxide fine particles with a refractive index of 1.4 to 1.6 and water-soluble resin is formed so that the refractive index of the toner used to form the image, the refractive index of the inorganic oxide fine particles, and the thickness of the transparent layer are in a given relation, so as to form a color image having uniform gloss like a photographic print.

JP 2001-92171 A also discloses a method of forming an image by electrophotography, in which silicone oil that is temperature-controlled so that its viscosity is 0.1 P or more and its surface tension is 15 dyn/cm or less is applied onto the surface of fixed toner layers, so as to prevent offset and to form an image provided with sufficient gloss like a photographic print.

Further, JP 2000-264481 A discloses an image forming device for electrophotographic image recording, in which, after formation of an image, the image formed surface is brought into contact with a roller having a roughened surface, with the contacting force being controlled according to a selected degree of gloss and considering the material on which the image is formed (transfer material), so as to form an image having reduced glossiness and comfortable to see.

SUMMARY OF THE INVENTION

The methods disclosed in JP 10-319621 A, JP 2001-92171 A, and JP 2000-264481 A are capable of adding enhanced value to images by providing image surfaces with gloss like that of photographic prints or by reducing glossiness of image surfaces to improve viewability.

Now, images produced by such printers contain a great variety of contents and it is therefore desired that suitable glossiness can be given with high degree of freedom in accordance with the contents of images in order to obtain more highly value-added images.

An image will contain glossy objects (contents forming the image) and objects not glossy at all. Accordingly, in order to form a higher-quality image with enhanced image texture, it is desirable to provide different degrees of gloss in different areas of the image depending on the objects recorded in the areas.

However, the methods disclosed in the patent documents cited above do not allow high degree of freedom to select the degree of glossiness, so they often fail to provide glossiness suitable for the image. Moreover, the methods disclosed in JP 10-319621 A, JP 2001-92171 A, and JP 2000-264481 are only capable of providing uniform glossiness on the entire image surface but are incapable of providing different degrees of glossiness in accordance with the contents recorded in different areas of the image. Also, in controlling image surface glossiness in accordance with the contents of images, obtaining desired glossiness with various kinds of recording media requires that images be processed under conditions suitable for target glossiness. However, the conventional techniques are incapable of such glossiness control.

The present invention has been made to solve the problems of the conventional techniques, and an object of the present invention is to provide an image forming method and an image forming apparatus capable of highly freely providing suitable glossiness in accordance with the contents of an image, e.g. objects recorded in the image, and more preferably, capable of providing glossiness appropriate for different contents recorded in different areas of the image, so as to form a high-quality image that properly expresses texture.

In order to attain the above-mentioned object, a first aspect of the present invention provides an image forming method comprising: a recording stop of recording an image on an image recording layer of an image recording medium according to image data; a material setting step of setting a coating film to be provided on said image recording layer according to glossiness data indicating glossiness or the image reproduced by said image data; a condition setting step of determining a condition of a surface processing of said coating film by considering said set coating film and according to said glossiness data; and a processing step of performing the surface processing of said coating film in accordance with said determined surface processing condition.

Preferably, said glossiness data indicates a degree of gloss for each area of the reproduced image.

Preferably, said material setting step sets said coating film according to a table using said glossiness data and said coating film as parameters.

Preferably, the surface processing in said processing step is performed by heating means for heating a surface of said coating film and pressing means for pressing a pressing member against a surface of said coating film, and said condition settling step determines said surface processing condition according to a table using, as parameters, in addition to said glossiness data and said coating film, at least one of heating temperature by said heating means, heating time by said heating means, pressing force by said pressing means, surface roughness of said pressing member, and pressing time by said pressing means.

Preferably, said heating means heats the surface of said coating film while locally controlling the heating.

Preferably, said recording step records said image at a resolution which is an integral multiple of that of said surface processing.

Further, in order to attain the above-mentioned object, a second aspect of the present invention provides an image forming apparatus comprising: an image recording medium feeding unit which feeds an image recording medium; an image recording unit which records an image on an image recording layer of an image recording medium according to image data; a control unit which sets a coating film to be provided on said image recording layer according to glossiness data indicating glossiness of the image reproduced by said image data and determines a condition of a surface processing of said coating film by considering said set coating film and according to said glossiness data; a coating film laminating unit which laminates said coating film set by said control unit on said image recording layer; and a surface processing unit which performs a surface processing of said coating film in accordance with said surface processing condition determined by said control unit.

Preferably, said glossiness data indicates a degree of gloss for each area of the reproduced image.

Preferably, said control unit sets said coating film according to a table using said glossiness data and said coating film as parameters.

Preferably, said surface processing unit includes heating means which heats a surface or said coating film and pressing means which presses a pressing member against a surface of said coating film, and wherein said control unit determines said surface processing condition according to a table using, as parameters, in addition to said glossiness data and said coating film, at least one of heating temperature by said heating means, heating time by said heating means, pressing force by said pressing means, surface roughness of said pressing member, and pressing time by said pressing means.

Preferably, said heating means heats the surface of said coating film while locally controlling the heating.

Preferably, said image recording unit records said image at a resolution which is an integral multiple of that of said surface processing by said surface processing unit.

According to the image forming method and the image forming apparatus of the present invention, it is possible to highly freely provide suitable glossiness in accordance with the contents of image areas, like objects recorded in the image, and more preferably, to provide different degrees of glossiness appropriate for the contents in different areas of the image, so as to form a high-quality image (hard copy) that properly expresses texture.

This application claims priority on Japanese patent application No. 2003-324363, the entire contents of which are hereby incorporated by reference. In addition, the entire contents of literatures cited in this specification are incorporated by reference.

DESCRIPTION OF THE PREFERRED EMBODIMENT

The image forming method of the present invention is now described in detail referring to the preferred embodiment illustrated in the accompanying drawings.

Figure 1:
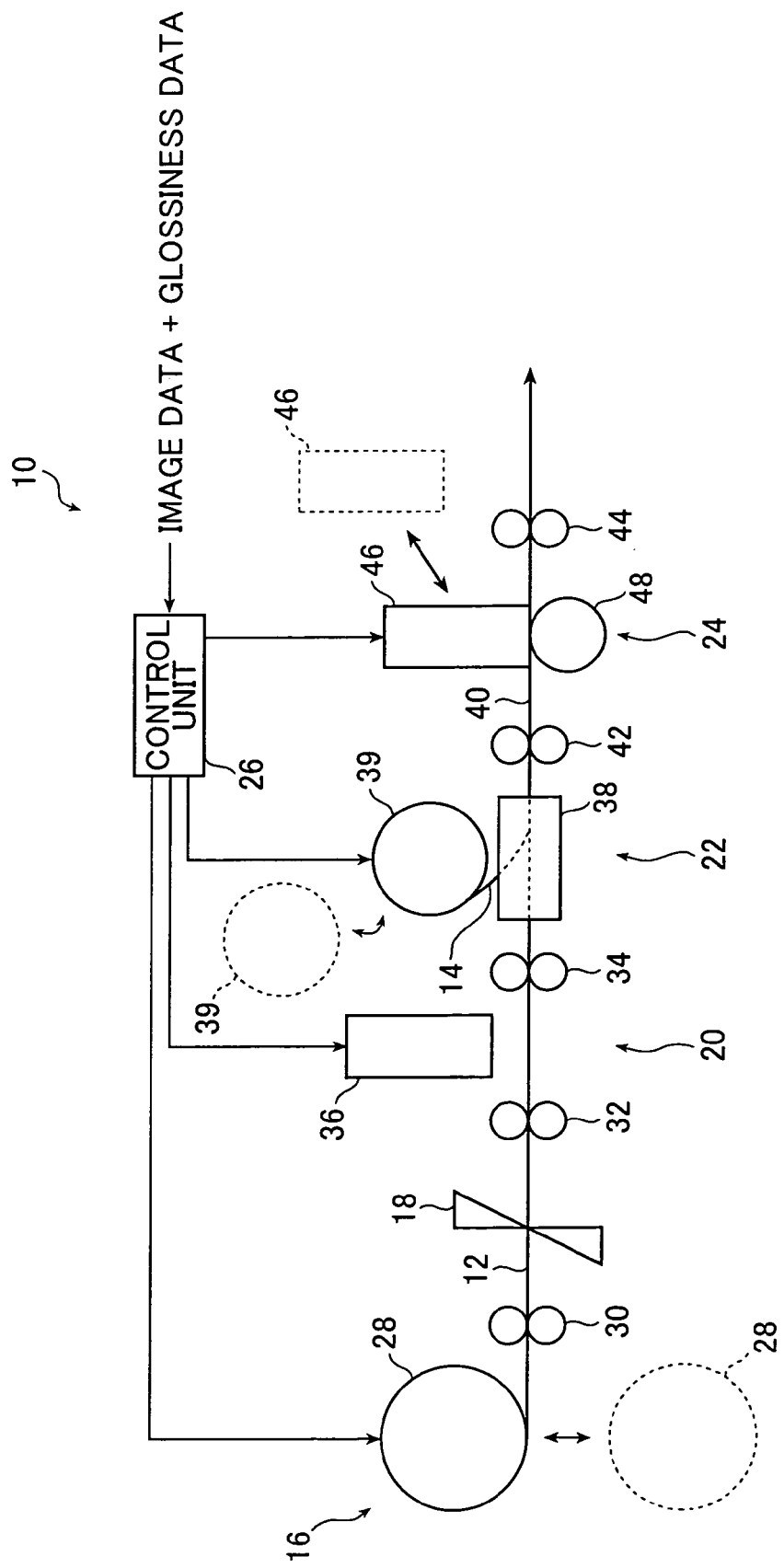
FIG. 1 is a conceptual view showing an image forming apparatus that implements an example of the image forming method according to the present invention.

FIG. 1 is a conceptual diagram illustrating an image forming apparatus that implements an example of the image forming method of the present invention.

An image forming apparatus 10 of FIG. 1 records an image by ink jet on the surface (on an image recording layer) of an image recording medium 12 (hereinafter referred to as recording medium 12), laminates a coating film 14 on the image recording surface, and then processes the surface of the coating film 14. The image forming apparatus 10 basically includes a medium feeding unit 16, a cutter 18, an image recording unit 20, a coating film laminating unit 22, a surface processing unit 24, and a control unit 26. Though not shown in FIG. 1, the image forming apparatus 10 may further include any components that would be provided in image forming apparatuses using sheet-like materials or apparatuses having sheet-like material laminating process, e.g. means for conveying the recording medium 12 or coating film 14, conveyance guides, positioning means, various sensors, etc.

The medium feeding unit 16 (hereinafter referred to as feeding unit 16) feeds the recording medium 12 on which an image is to be recorded (formed).

In the example of FIG. 1, a long strip of recording medium 12 wound to form a medium roll 28 is loaded in the feeding unit 16 and a feeding roller pair 30 draws out the recording medium 12 from the medium roll 28 and feeds it downstream.

As shown by dotted line in FIG. 1, a plurality of medium rolls 28 of different recording media 12 are prepared. The feeding unit 16 feeds a recording medium 12 specified by, e.g. an input instruction from an operator, from the corresponding medium roll 28. A single kind of recording medium 12 may be prepared, or two or more kinds of, or an arbitrary number of, recording media 12 may be prepared. The image forming apparatus 10 may be constructed to allow loading of only a single medium roll 28 in the feeding unit 16, and then an operator etc. will set an appropriate one depending on the image to be formed (a hard copy).

In the present invention, the recording medium 12 is not limited to a particular kind and any kind of recording medium can be used as long as It has a base and an image recording layer (a colorant layer (including a region for holding (to be impregnated with) ink or toner in the base)) and conforms to the image recording method employed in the image recording unit 20 described later. For example, the recording medium 12 can be plain paper or ink jet paper when ink jet process is used, or it can be plain paper when electrophotography process is used, or it can be photographic paper when a photographic printer is used.

The thickness of the recording medium 12 is not particularly limited, either, which can be in a common range for the recording medium 12, preferably from 50 µm to 150 µm.

The recording medium 12 fed from the feeding unit 16 is moved to the image recording unit 20 by the feeding roller pair 30 and a scanning conveyer roller pair 32 that belongs to the image recording unit 20. The cutter 18 is located between the feeding roller pair 30 and the scanning conveyer roller pair 32.

The cutter 18 is a conventional cutter for cutting sheet-like materials. The conveyance of the recording medium 12 by the feeding roller pair 30 and the scanning conveyer roller pair 32 is once stopped when the length of the recording medium 12 beyond the cutter 18 becomes equal to the size of the image to be formed (the size of the hard copy). Then the cutter 18 cuts the recording medium 12 to form a cut sheet of the image size and then the scanning conveyer roller pair 32 restarts to convoy the recording medium 12 downstream to the recording position.

The image recording unit 20 (hereinafter referred to as recording unit 20) is an image recording moans that records an image by ink jet on the surface (image recording layer) of the recording medium 12. The image recording unit 20 includes scanning conveyer roller pairs 32 and 34 and an ink jet recording head 36 (hereinafter referred to as recording head 36) located between the scanning conveyer roller pairs 32 and 34.

The recording head 36 is a ink jet recording head, which can be a thermal ink jet recording head, a piezo-type ink jet recording head, or an electrostatic ink jet recording head, for example.

The recording head 36 is a so-called line head that has rows of nozzles (ink discharge ports) having a length exceeding the maximum size of the width direction of the corresponding recording medium 12 (the direction perpendicular to the elongate direction of the recording medium 12 before cut, which is hereinafter referred to as a width direction). For example, the recording head 36 has four rows of nozzles that respectively eject ink droplets of C (cyan), M (magenta), Y (yellow), and K (black), which are arranged so that the direction in which the nozzle rows extend corresponds to the width direction and so that the ink ejecting direction is directed to a given recording position.

In the recording unit 20, while the scanning conveyer roller pairs 32 and 34 scanning-convey the recording medium 12 in the direction perpendicular to the width direction, the droplet ejecting means for ejecting ink droplets from each nozzle is modulation-driven according to image data supplied from the control unit 26 described later, whereby ink droplets are ejected from the recording head 36 to form a full-color image, with four colors, on the surface of the recording medium 12 in accordance with the image data.

In the present invention, the image recording process by ink jet is not limited to that using a line head, but it can be an ink jet image recording process using a so-called serial head, where, the direction of the rows of nozzles coincides with the direction in which the recording medium 12 is moved, and the recording medium 12 is intermittently moved as the recording head scans (shuttles) in the direction perpendicular to the direction of conveyance (in the example of FIG. 1, in the width direction of the recording medium 12).

Also, the present invention does not limit the image recording onto the recording medium 12 to the ink jet process, but any image recording process can be employed. For example, the image recording may employ electrophotography. Or, it may use a digital photographic printer in which photographic paper (photosensitive material) is scanned and exposed with a light beam modulated according to an image to be recorded and then subjected to given wet development and drying process. Alternatively, the image recording process may be achieved by a method in which photosensitive material (donor) is exposed with a light beam modulated according to an image to be recorded to form a latent image and the image is thermally developed and transferred to an image receiving medium in the presence of image forming solvent.

The recording medium 12 on which an image is recorded is next fed to the coating film laminating unit 22 (hereinafter referred to as laminating unit 22) which has a laminating means 38, where the recording medium 12 is laminated with a coating film 14.

The laminating means 38 is a laminating/bonding means of sheet-like materials having positioning means, pressing rolls, etc., which further includes means for drawing out the coating film 14, conveying means, a cutter, etc.

In the example of FIG. 1, like the recording medium 12, the coating film 14 is also prepared in the form of a long strip and wound to form a coating film roll 39, which is loaded in the laminating unit 22.

In the laminating means 38, drawing roller pair draws out the coating film 14 from the coating film roll 39 and the cutter cuts it to the same size as the recording medium. Then the recording medium 12 and the coating film 14 are properly positioned, superposed (with an adhesive etc. when needed), and pressed (and/or heated when needed), whereby the coating film 14 is laminated on the surface of the recording medium 12.

As shown by dotted line in FIG. 1, like the medium rolls 28 described earlier, a plurality of coating film rolls 39 of different coating films 14 are prepared and loaded. In accordance with an instruction from the control unit 26 as will be described later, the laminating unit 22 feeds the specified coating film from the corresponding coating film roll 39 and laminates it on the recording medium 12.

The individual coating films 14 differ in material, thickness, surface roughness, etc. As will be described later, expressible degrees of gloss differ when even one of these factors differs. Therefore, in the present invention, coating films 14 differing in thickness, coating films 14 differing in surface roughness, or coating films 14 differing in a refractive index, are treated as different kinds of coating films 14 even when they are made of the same material. A single kind of coating film 14 may be prepared, but, preparing two or more kinds of coating films 14 is preferred. Also, the laminating unit 22 may be constructed to allow loading of only a single coating film roll 39 and then an operator etc. will set an appropriate one.

In the present invention, the coating films 14 employed are not limited to particular kinds, and any kinds of coating films can be used as long as they do not interfere with the appearance of the image recorded on the recording medium 12.

For example, the coating film may be made of polyurethane resin as disclosed in JP 10-34909 A, or silicone resin as disclosed in JP 10-309846 A, or thermoplastic polyethylene resin as disclosed in JP 2000-108454 A.

The thickness is not particularly limited and can be appropriately determined depending on the material, preferably, in the range of 10 μm to 100 μm.

As will be described later, in the image forming method of the present invention, a thermal head 46 has a heating part (the surface of the glaze) with certain surface roughness and the surface of the coating film 14 is processed by the thermal head 46 with locally controlled heating, whereby the surface roughness of the heating part of the thermal head 46 is transferred to the coating film 14. Thus the surface roughness of the coating film 14 is controlled differently in different areas of the image, thereby providing glossiness according to the contents of the image, e.g. objects in the image, so as to suitably express texture.

While the image forming apparatus 10 of FIG. 1 forms the coating film 14 on the recording medium 12 by laminating the sheet-like coating film 14 on the image recording surface of the recording medium 12, the present invention is not limited to this method. For example, paint may be applied on the recording medium 12 according to a target thickness and dried to form a coating film. A coating film may be formed by ejecting transparent coating liquid, e.g. by ink jet.

Also, when needed, prior to the surface processing, a surface roughening process may be applied to a coating film thus formed with paint.

A laminate 40 is obtained by laminating the recording medium 12 and the coating film 14 together in the laminating unit 22. The laminate 40 is then moved by a conveyer roller pair 42 to the surface processing unit 24, where the coating film 14 is surface-processed. As a result, an image (a hard copy) according to the image forming method of the invention is produced and carried by a discharging roller pair 44 to a paper discharge tray (not shown), for example.

The surface processing unit 24 includes the thermal head 46 and a platen roller 48.

The thermal head 46 has a heating part (glaze) in which heat generating elements (heaters) formed of electrodes and heat generating resistors etc. are arranged in one direction. The heat generating elements are arranged in the direction perpendicular to the direction in which the platen roller 48 conveys the laminate 40 (that is, the width direction coincides with the direction in which the element rows extend).

In the present invention, the thermal head 46 (surface processing means) performing surface processing is not required to have a very high resolution. For example, a resolution of about 50 dpi, which causes no unnaturalness when viewed, suffices. This reduces cost. Also, setting the resolution of the recording head 36 (recording means) at an integral multiple of the resolution of the thermal head 46 simplifies surface processing control.

In the surface processing unit 24, as in an image recording process by a known thermal recording printer, the laminate 40, nipped by the thermal head 46 (its heating/pressing part) and the platen roller 48, is conveyed in the elongate direction (the direction perpendicular to the width direction) as the platen roller 48 rotates. During the conveyance, the heat generating elements of the thermal head 46 are modulation-driven according to surface processing conditions (heating temperature) supplied from the control unit 26.

During this process, as the heating part (pressing part) of the thermal head 46 has a certain degree of surface toughness (surface property), the surface roughness is transferred to the surface of the coating film 14 by heating/pressing. When the heating temperature is low, the surface roughness of the heating part of the thermal head 46 is transferred not sufficiently but dully to the surface of the coating film 14 (that is, a lower degree of surface roughness, relative to the surface roughness of the heating part, is transferred to the surface of the coating film 14).

Thus, different areas of the surface of the coating film 14 can be heated/pressed under different heating conditions by locally controlling the heating by the thermal head 46, so as to form (transfer) desired surface roughness on the surface of the coating film 14. In the image forming apparatus 10 of FIG. 1, the degrees of surface roughness in individual areas of the image are controlled according to glossiness data described later, whereby glossiness is given to individual areas of the image in conformity with the contents of the image, e.g. objects in the image (the image recorded in the recording unit 20).

In this invention, as shown by dotted line in FIG. 1, a plurality of thermal heads 46 having heating parts with different degrees of surface roughness may be prepared, and then a suitable thermal head 46 can be selected according to the target surface roughness of the coating film 14. In this case, the control unit 26 selects a thermal head 46 that can achieve the target range of surface roughness, according to a relation between the coating film and surface roughness, and the like, as will be described later.

This embodiment of the present invention adopts a thermal head 46 which can serve both as a heating means and a pressing means. However, this is not the sole case and a heating means and a pressing means may separately be provided. In such cases, a coating film 14 is heated by the heating means, and subsequently, a pressing member is pressed against a surface of the coating film 14.

The control unit 26, provided to control the entire image forming apparatus 10, sets (selects) a coating film 14 in accordance with supplied image data and glossiness data, while referring to a material setting table which will be described later, and then it sends instructions to the feeding unit 16 and the laminating unit 22.

The control unit 26 also supplies the image data to the recording head 36. Further, using a processing condition table described later, the control unit 26 sets (determines) surface processing conditions, including conditions for driving the thermal head 46, and supplies the conditions to the thermal head 46 etc.

In the present invention, the image data is two-dimensional image data that conforms to the employed image recording process, and therefore, in the example of FIG. 1, it is C, M, Y, and K image data conforming to the image recording process performed by the recording head 36.

Figure 2:
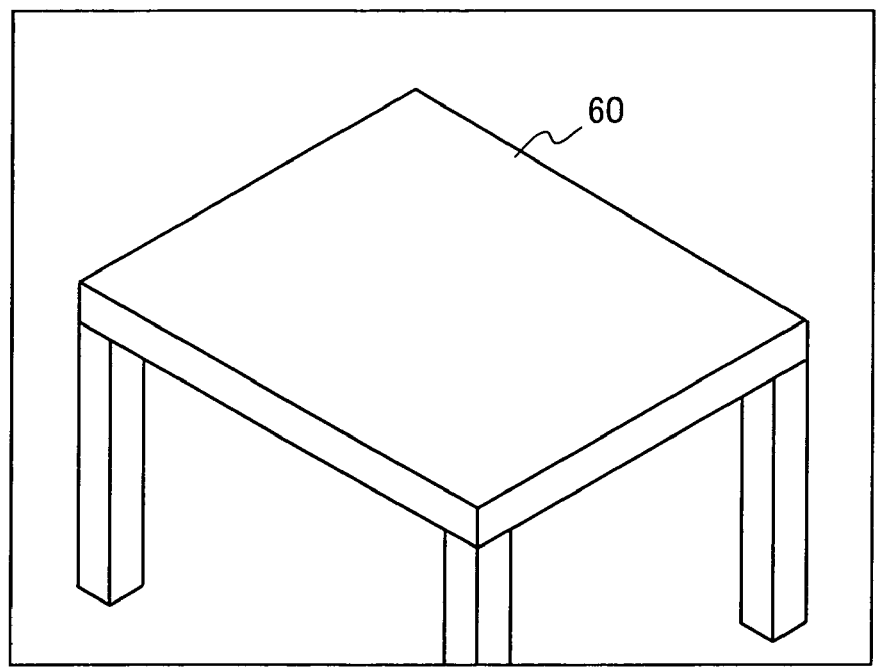
FIG. 2 is a conceptual view showing an example of an image formed the image forming apparatus shown in FIG. 1.

The glossiness data is two-dimensional glossiness data for individual areas of the image reproduced by the image data supplied to the control unit 26 together with the glossiness data. For example, as shown in PIG. 2, when the image (the image reproduced by the image data) contains a table 60, the glossiness data may indicate a degree of gloss of 25% for the area of the table 60 and a degree of gloss of 10% for the background area. In the image of FIG. 2, when a (CD) case is placed on the table 60 and a CD is placed thereon, the data may indicate a degree of gloss of 25% for the area of the table 60, a degree of gloss of 30% for the area of the case, a degree of gloss of 40% for the area of the CD, and a degree of gloss of 10% for the background area.

Note that, in the present invention, the glossiness data is not limited to data that directly indicates glossiness of individual areas.

For example, the degrees of gloss for various materials of objects may be determined in advance and set in the control unit 26, as a degree of gloss of 40% for metal, a degree of gloss of 25% for wood, a degree of gloss of 10% for cloth, and a degree of gloss of 15% for paper. Then information showing the materials of individual areas is supplied as the glossiness data and the control unit 26 knows the degrees of gloss for the individual areas according to the material information.

Also, in the invention, the glossiness can be measured and the glossiness data can be generated by considering light absorption at the coating film 14 and reflection at the recording medium 12, according to, e.g. the JIS Z 8741 mirror-surface glossiness measurement method.

The operation of the image forming apparatus 10 is now described to show more details of the image forming method of the present invention.

Figure 3:
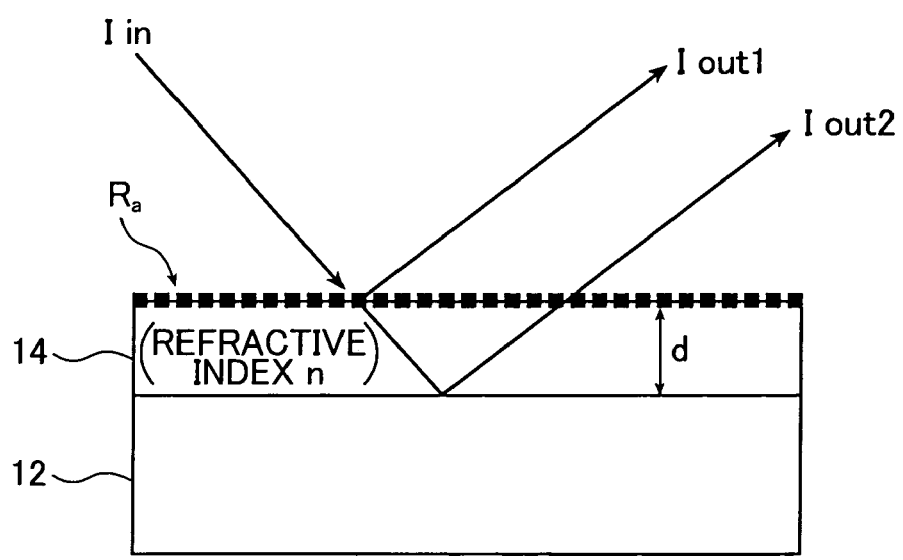
FIG. 3 is a schematic sectional view of a hard copy formed by the image forming apparatus shown in FIG. 1 used to describe a physical factor of the surface glossiness.

As schematically shown in FIG. 3, with a hard copy formed of the image recording medium 12 (base/image recording layer)/coating film 14, produced by the image forming apparatus 10 of FIG. 1, a physical factor of the surface glossiness (reflected light $I_{out}$ with the incident light $I_{in}$) is chiefly determined by the refractive index, n, of the coating film 14, the film thickness, d, of the coating film 14, and the surface roughness, Ra, of the coating film 14. While, more strictly, the surface glossiness Is affected also by the surface refractive index and the thickness of the image recording medium 12 (the image recording layer), the effect is usually visually negligible.

Figure 4:
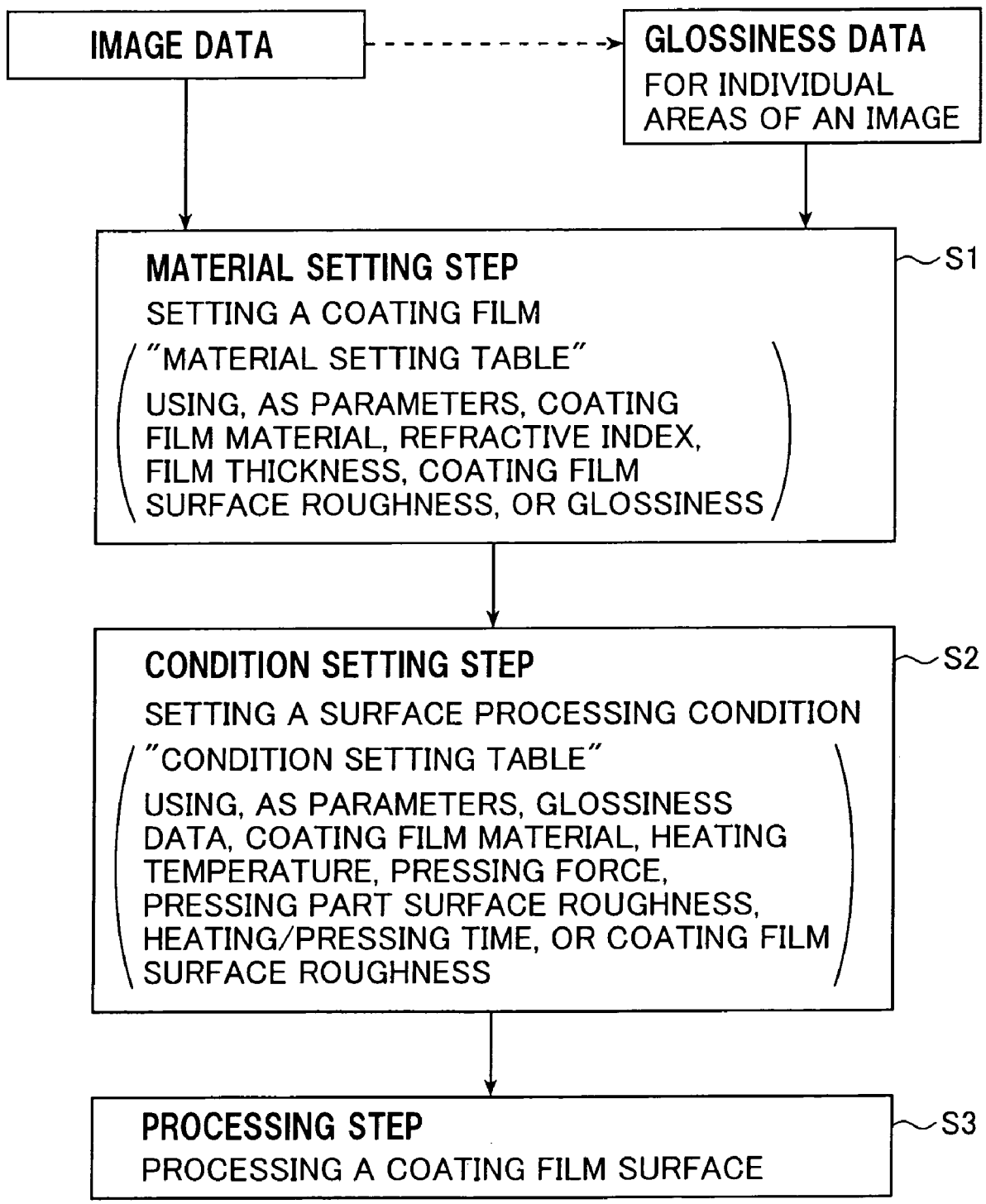
FIG. 4 is a flowchart showing an image forming method of the image forming apparatus shown in FIG. 1.

In the present Invention, as shown in FIG. 4, first, a coating film 14 is selected (its material, thickness, surface roughness, etc. are set: a material setting step; S1) in order to express desired degrees of gloss corresponding to the contents in individual areas of the image, e.g. the table 60 and the background, and next, surface processing conditions are set (a condition setting step; S2) to form desired surface roughness on the surface of the coating film 14, and then surface processing is applied to the coating film 14 (a processing step; S3).

As described above, when image data for the recorded image and the corresponding glossiness data are supplied to the control unit 26, then the control unit 26 supplies the image data to the recording unit 20 and selects a coating film 14 to be employed, according to the glossiness data.

Figure 5A:
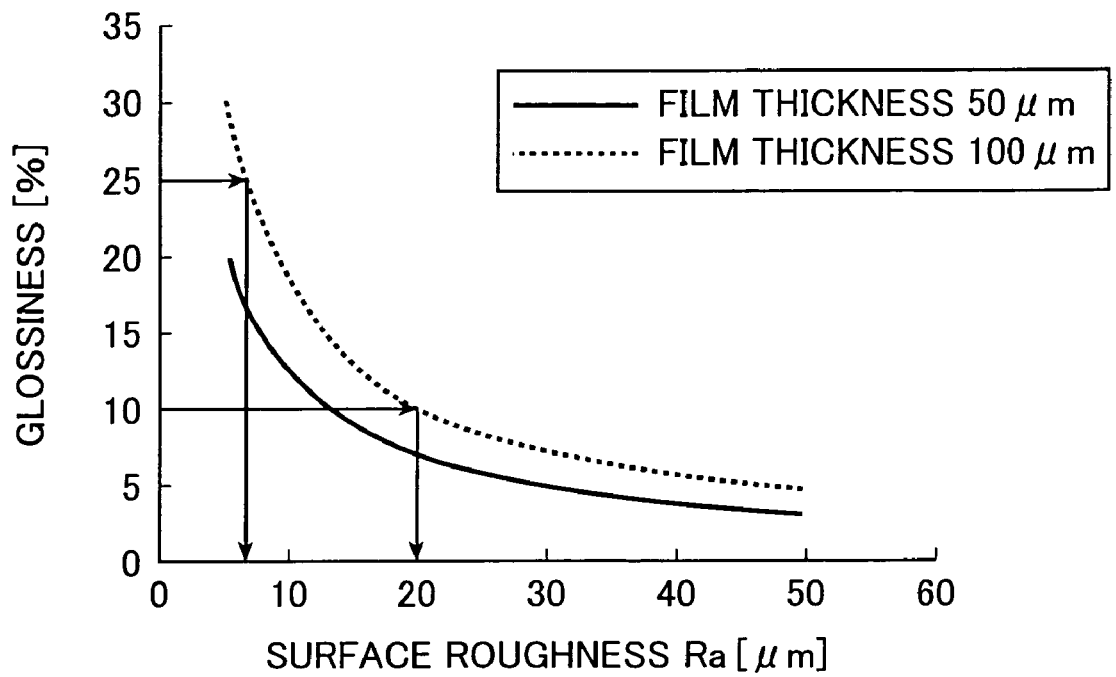
FIG. 5A is a diagram showing an example of a material setting table employed in the image forming apparatus shown in FIG. 1.

The control unit 26 contains a material setting table as shown in FIG. 5A, which shows the relation between surface roughness Ra [μm] and glossiness [%] for each coating film 14. When supplied with the glossiness data, the control unit 26 knows the range of glossiness that should be expressed on the image (hard copy) and refers to the material setting table to select one of a plurality of coating films 14 that is able to express the target glossiness.

For example, as shown in FIG. 5A, with two kinds of coating films 14 made of the same material and having the same surface roughness but different thicknesses (50 μm and 100 μm), and with glossiness data indicating 25% gloss for the table 60 area and 10% gloss for the background in an image as shown in FIG. 2, then the control unit 26 refers to the material setting table and selects the 100-μm-thick coating film 14 that can express both degrees of gloss, and instructs the laminating unit 22 to use this coating film 14.

When, considering the target glossiness, a plurality of coating films 14 satisfy conditions determined in the surface processing condition setting step described later, i.e. when a plurality of coating films 14 can be employed, then the selection may be made arbitrarily.

Next, with the coating film 14 thus selected, and according to the glossiness data, the control unit 26 refers again to the material setting table to set surface roughness Ra for expressing the target glossiness for each area of the image.

That is to say, for instance, with the example of FIG. 2, since the glossiness data indicates 25% gloss for the area of the table 60 and 10% gloss for the background area, the control unit 26 refers to the material setting table of FIG. 5A and sets the surface roughness Ra at 7 μm for the 25%-gloss table area and sets the surface roughness Ra at 20 μm for the 10%-gloss background area.

Then, according to the glossiness data, i.e. according to the values of surface roughness Ra thus set, the control unit 26 determines, for each image area, a condition for the surface processing by the thermal head 46 so that the set surface roughness of the coating film 14 can be achieved.

Figure 5B:
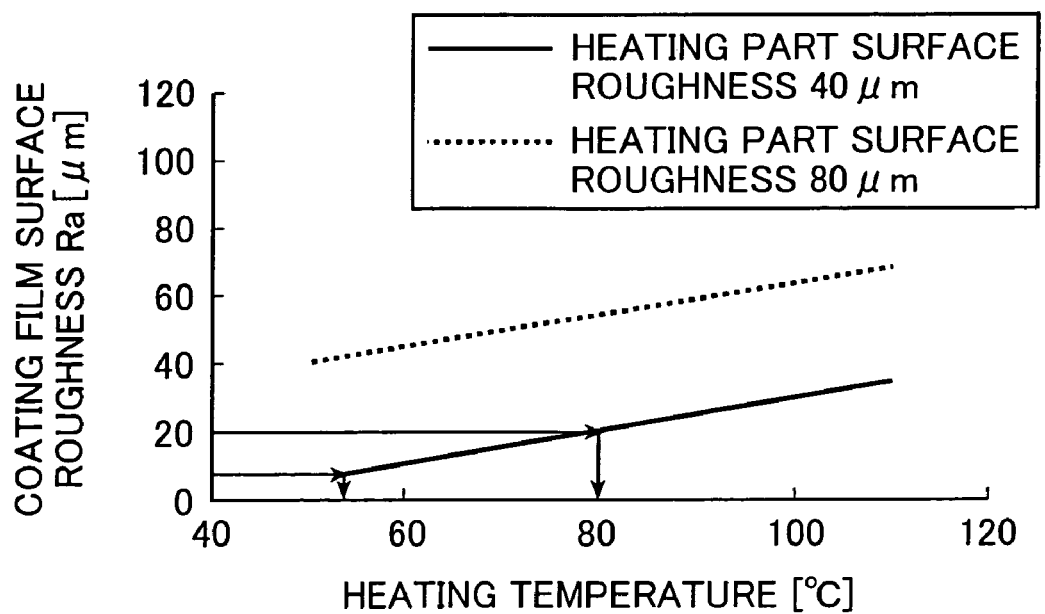
FIG. 5B is a diagram showing an example of a conditioning setting table employed in the image forming apparatus shown in FIG. 1.

The control unit 26 contains a condition setting table as shown in FIG. 5B for each coating film 14, which shows the relation between the surface roughness Ra of the coating film 14 and heating temperature T [° C.] for the surface processing by the thermal head 46. In this example, referring to the condition setting table, when using a thermal head 46 having a heating part with a surface roughness of 40 μm, the heating temperature is set at 80° C. for the area of surface roughness Ra of 20 μm (gloss of 10%) to form the target roughness and the heating temperature is set at 52° C. for the area of surface roughness Ra of 7 μm (gloss of 25%) to form the target roughness.

Next, the control unit 46 supplies the heating temperature information for each image area to the surface processing unit 24.

When the employed coating film 14 and surface processing conditions (heating temperatures) by the thermal head 46 are thus determined and the information is supplied to the relevant units, then, first, the feeding roller pair 30 in the feeding unit 16 draws out the specified recording medium 12 from the corresponding medium roll 28 and feeds it to the cutter 18, and then the cutter 18 cuts the recording medium 12 to the size of the image to be formed as described earlier.

Next, in the recording unit 20, as the scanning conveyer roll pairs 32 and 34 scan-convey the recording medium 12, the recording head 36 records a full-color image by ink jet on the surface of the recording medium 12 in accordance with the supplied image data.

Next, in the laminating unit 22, the laminating means 38 draws out the selected coating film 14 from the corresponding coating film roll 39, cuts the coating film 14 to the size of the image to be formed, and laminates/bonds it on the surface of the recording medium 12 on which image is recorded.

Next, the conveyer roller pair 42 passes the laminate 40 of the recording medium 12 and the coating film 14 to the surface processing unit 24. In the surface processing unit 24, with the laminate 40 being nipped and conveyed by the thermal head 46 (heating part) and the platen roller 48, the thermal head 46 (individual heat generating elements) is driven according to the supplied heating temperature (surface processing conditions) to apply surface processing to the coating film 14. Thus the surface roughness of the heating part of the thermal head 46 can be transferred to the surface of the coating film 14 at the set heating temperatures to provide the surface of the coating film 14 with surface roughness corresponding to the target glossiness.

Then, with the coating film 14 thus surface-processed, the laminate 40 (i.e. an image (a hard copy) produced by the image forming method of the present invention) is discharged by the discharging roller pair 44 to a discharge tray (not shown).

In this example, the surface processing of the coating film 14 is controlled by controlling the temperature of the thermal head 46 (heating means).

However, the present invention is not limited to this method of controlling the surface processing by the thermal head 46. For example, various processing conditions, such as heating/pressuring time, pressing force, surface roughness of the heating part, etc., can be controlled to control the surface roughness of the coating film 14 according to the glossiness data.

Needless to say, a plurality of factors of processing conditions, including heating temperature, can be controlled in combination.

For example, by setting some levels of the pressing force of the thermal head 46, and with a condition setting table created on the basis of combinations of the pressing force levels and coating films 14, the pressing force of the thermal head 46 may be set (selected) in accordance with the target glossiness (target surface roughness Ra), and then surface processing conditions, such as heating temperature, can be set under the selected pressing force condition. Alternatively, with a plurality of thermal heads 46 having heating parts with differently roughened surfaces, and with a condition setting table based on combinations of the thermal heads and coating films 14, a thermal head 46 to be employed can be selected in accordance with the target glossiness (target surface roughness Ra) and then surface processing conditions like heating temperature for each area can be set using the condition setting table.

In any case, condition setting tables can be created by previously knowing, by experiment or by simulation, relations between processing conditions like pressing force and processing time and the surface roughness Ra of the coating film 14, and the condition setting tables are set in the control unit 26.

While the image forming method and the image forming apparatus of the present invention have been described in detail, it is understood that the embodiments described above are illustrative and not restrictive and numerous other modifications and variations can be devised without departing from the scope of the present invention.

For instance, in the example shown above, as the preferred embodiments, the glossiness data indicates different degrees of gloss for different areas of an image according to the contents and the thermal head is thereby locally controlled to apply surface processing to areas of the image under different conditions. However, the present invention is not limited to this example but uniform glossiness data for the entire image area may be used to provide glossiness to the image by uniform surface processing to the entire image.

This example, too, is capable of providing glossiness suitable for the contents or the image far more freely than conventional techniques by allowing selection of coating films and setting of surface processing conditions, thereby forming higher-quality image.

Also, in the illustrated example, a coating film having a smooth surface is formed on the recording medium and surface-processed according to glossiness data to roughen the surface. However, in the present invention, the method of forming irregularities on the coating film by surface processing is not limited to this method. For example, in an opposite way, a coating film having a rough surface may be formed and processed, e.g. by heating, to reduce the irregularities, so as to obtain a coating film having surface roughness in conformity with glossiness data.

Furthermore, the method of roughening the coating film surface is not limited to the above-described method using a thermal head. For example, the coating film may be roughened by forming indentations with a heated needle utilizing "Millipede", an information recording technique presented by IBM.

What is claimed is:

1. An image forming apparatus comprising:
   an image recording medium feeding unit which feeds an image recording miedium;
   an image recording unit which records an image on an image recording layer of an image recording medium according to image data;
   a control unit which sets a coating film to be provided on said image recording layer according to glossiness data indicating glossiness of the image reproduced by said image data and determines a condition of a surface processing of said coating film by considering said set coating film and according to said glossiness data;
   a coating film laminating unit which laminates said coating film set by said control uit on said image recording layer; and
   a surface processing unit which performs a surface processing of said coating film in accordance with said surface processing condition detemined by said control unit.

2. The image forming method according to claim 1, wherein said glossiness data indicates a degree of gloss for each area of the reproduced image.

3. The image forming method according to claim 1, wherein said material setting step sets said coating film according to a table using said glossiness data and said coating film as parameters.

4. The image forming method according to claim 1,
   wherein the surface processing in said processing step is performed by heating means for heating a surface of said coating film and pressing means for pressing a pressing member against a surface of said coating film, and
   wherein said condition setting step determines said surface processing condition according to a table using, as parameters, in addition to said glossiness data and said coating film, at least one of heating temperature by said heating means, heating time by said heating means, pressing force by said pressing means, surface roughness of said pressing member, and pressing time by said pressing means.

5. The image forming method according to claim 4, wherein said heating means heats the surface of said coating film while locally controlling the heating.

6. The image forming method according to claim 1, wherein said recording step records said image at a resolution which is an integral multiple of that of said surface processing.

* * * * *

UNITED STATES PATENT AND TRADEMARK OFFICE
CERTIFICATE OF CORRECTION

| | |
|---|---|
| PATENT NO. | : 7,044,594 B2 |
| APPLICATION NO. | : 10/942927 |
| DATED | : May 16, 2006 |
| INVENTOR(S) | : Kusunoki |

It is certified that error appears in the above-identified patent and that said Letters Patent is hereby corrected as shown below:

In column 12, line 17, replace claims 2 to 6 with the following claims:

2. The image forming apparatus according to claim 1, wherein said glossiness data indicates a degree of gloss for each area of the reproduced image.

3. The image forming apparatus according to claim 1, wherein said control unit sets said coating film according to a table using said glossiness data and said coating fillm as parameters.

4. The image forming apparatus according to claim 1,
wherein said surface processing unit includes heating means which heats a surface of said coating film and pressing means which presses a pressing member against a surface of said coating film, and
wherein said control unit determines said surface processing condition according to a table using, as parameters, in addition to said glossiness data and said coating film, at least one of heating temperature by said heating means, heating time by said heating means, pressing force by said pressing means, surface roughness of said pressing member, and pressing time by said pressing means.

5. The image forming apparatus according to claim 4, wherein said heating means heats the surface of said coating film while locally controlling the heating.

6. The image forming apparatus according to claim 1, wherein said image recording unit records said image at a resolution which is an integral multiple of that of said surface processing by said surface processing unit.

Signed and Sealed this

Fifth Day of December, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,044,594 B2 | Page 1 of 1 |
| APPLICATION NO. | : 10/942927 | |
| DATED | : May 16, 2006 | |
| INVENTOR(S) | : Kusunoki | |

It is certified that error appears in the above-identified patent and that said Letters Patent is hereby corrected as shown below:

In column 11, line 48, please replace the word "miedium" with --medium--.
In column 12, line 11, please replace the word "uit" with --unit--.
In column 12, line 16, please replace the word "detemined" with --determined--.
In column 12, line 24, please replace the word "fillm" with --film--.

Signed and Sealed this

Seventeenth Day of April, 2007

JON W. DUDAS
*Director of the United States Patent and Trademark Office*